2,899,320

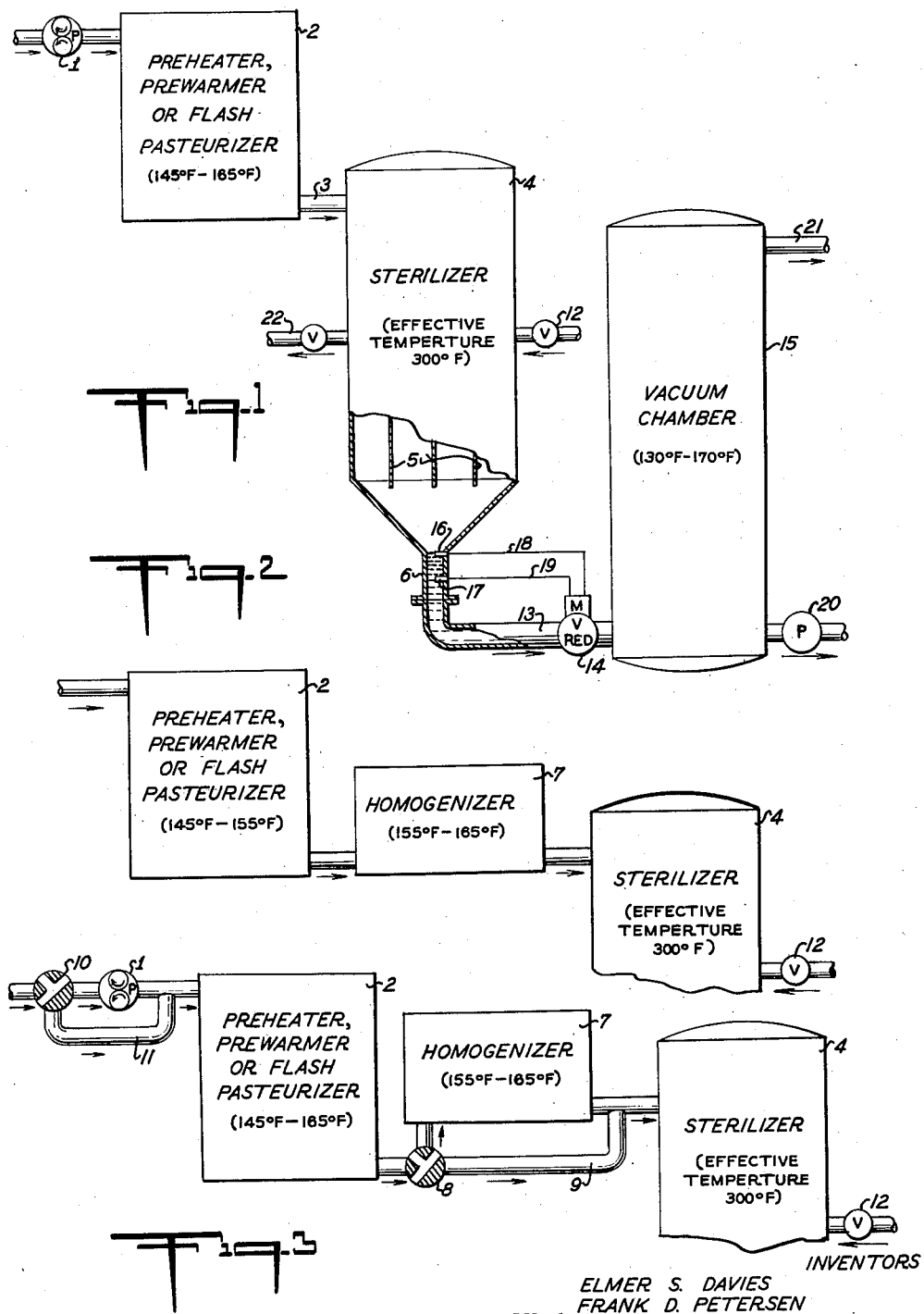

PROCESS FOR THE STERILIZATION OF MILK

Elmer S. Davies, Takoma Park, Md., and Frank D. Petersen, Philadelphia, Pa., assignors, by mesne assignments, to Daveat Milk Processes Co., Washington, D.C., a corporation of Delaware Application September 26, 1956, Serial No. 612,240

10 Claims. (Cl. 99—216)

Our present invention relates to a process for the sterilization of fluent materials, and has particular reference to a novel and efficient process for heat treating milk to sterilize the same without disturbing its natural flavor and stability. This highly advantageous and commercially practical result is accomplished by application of heat to every particle of the milk within a time-temperature relationship which protects each constituent of the milk from adverse chemical and physical changes.

Heretofore, most processes for heat treating milk have failed to take into consideration and to recognize the differences which exist among various nutrient constituents of the milk as regards their reaction to high heat. It is known to those skilled in the art of milk chemistry, that milk contains among its various constituents, such nutrient constituents as:

Water
Proteins, such as casein, lactalbumin, lactoglobulin
Vitamins
Gases
Milk fat
Lactose (sugar of milk)
Milk ash
Pigments
Enzymes
Cellular material Each of these nutrient constituents respond or react differently to the influence or effect of various time-temperature relationships, and, hence, any process for heat treating milk to sterilize the same must take into consideration and recognize the characteristics of each of these nutrient constituents, and of any living organisms such as bacteria, mould and yeast present in nonsterile milk, and the response or reaction of each to various degrees of temperature and duration of heat treatments. To meet the demands and requirements of the consumer, sterilized milk must retain all of the desirable properties and characteristics of fresh milk insofar as relates to flavor, stability, body, color, etc.

In the prior art processes of heat treatment to effect sterilization, the processes have been such as to affect adversely various ones of these desirable properties and characteristics, particularly as regards the natural flavor of the milk.

It is the primary object of our present invention to provide a process for the heat sterilization of milk, in which substantially complete sterilization is effected without deleteriously or adversely affecting the normal, natural properties or characteristics of the milk.

Preservation of the quality of milk involves not only the proper time-temperature relationship to effect sterilization of the milk, but also involves the actions and interactions of various constituents of the milk as they may affect the flavor. For example, it is known to those skilled in the art of heat treatment of milk that two of the principal reactants in the "browning" of milk are lactose and casein. Neither of these milk constituents "browns" readily when heated alone, but when heated together, they "brown" readily.

All the relationships between various constituents of milk are not fully understood even by those highly skilled in the art of milk chemistry. However, it has long been recognized that any heat treatment which adversely affects any of the constituents of the milk may alter the quality of the milk and lessen its consumer acceptance. Therefore, it is a further object of our present invention to provide a process for the heat sterilization of milk which will not adversely affect any of the constituent elements of milk, and which will conform specifically to the following relationships:

(1) *Living organisms.*—The time-temperature relation employed to effect substantially complete sterilization is as follows:

300° F. for .8 of a second
290° F. for 5 seconds
280° F. for 15 seconds
260° F. for 120 seconds (2) *Enzymes.*—The time-temperature relation employed to effect substantially complete inactivation of the enzymes present in milk being processed is as follows:

300° F. for 1.5 seconds
295° F. for 2.8 seconds
290° F. for 4.8 seconds
285° F. for 8 seconds
280° F. for 18 seconds The effectiveness of the above-specified time-temperature relation insofar as relates to the inactivation of the lipase enzyme, will be largely determined by the extent to which the fat content of the milk is broken down to thus expose the lipase enzyme to direct heat exchange relation with the sterilizing medium.

(3) *Coagulation.*—The higher the temperature to which the milk is subjected, the greater is the tendency for the milk to coagulate, this coagulation resulting from the combination of the casein, milk sugar, and whey portions of the protein content of the milk. This coagulation results in an undesirable increase in the viscosity of the milk and produces an "off" flavor which is objectionable. To avoid this coagulation, we have determined that the time-temperature relation should not exceed the following limits:

250° F. for approximately 120 seconds
300° F. for approximately 3 seconds
310° F. for approximately 1 second (4) *Sulfhydrils.*—The most recent researches on milk flavor have revealed that the "cooked" flavor of heated milk is due, in large measure, to the liberation of sulphides of milk. Sulfhydrils are formed by the breakdown, or denaturation of the whey portion of milk proteins, particularly the beta lactoglobulin, and we have discovered that this breakdown initiates when milk is subjected to temperature of 170° F. or higher. The intensity of cooked flavor increases as the temperature used in heat treatment is increased, depending upon the number of sulfhydril groups which are activated, the amount of oxidation of sulfhydril groups by atmospheric oxygen, and the extent of irreversible action of sulfhydril groups with other constituents of the milk.

It is a further object of our present invention to provide a process for the heat sterilization of milk, which process not only is devoid of the disadvantages of prior art processes, but does not affect adversely, either physically or chemically, any essential time-temperature relationship or any natural interrelationship of the constituents of milk. The indicated time-temperature relationship of the heat treatment is one and a half seconds as a minimum to approximately three seconds as a maximum at a temperature of 300° F. This specific time-temperature relationship is critical to the successful operation of our improved process, it being apparent from an examination of the above paragraphs numbered "(1)" through "(3)," that any material variations in the specific temperature or duration of exposure would tend to affect adversely one or more of the various properties of the milk.

It is a further object of our present invention to provide a process for the heat sterilization of milk in which every particle of the milk is heated and held for a minimum period of one and a half seconds to a maximum period of approximately three seconds at a temperature of 300° F. to thus effect substantially complete sterilization without affecting adversely any one of the natural properties and characteristics of the milk. The efficiency of the process of our present invention is due, in a large measure, to the fact that every particle of the milk is subjected to the specified time-temperature relation, and that no particle of the milk is heated to a temperature of more than 300° F. or held at that temperature for a period in excess of approximately three seconds.

It is a further object of our present invention to provide a process for effecting the heat sterilization of milk in which the milk is preheated to a temperature of approximately 145° F. to approximately 165° F., enters a sterilizer wherein each and every particle of the milk is subjected to contact with a highly heated gaseous treating medium, such as a steam at a controlled and effective temperature whereby the temperature of the milk is raised to 300° F. for a minimum period of one and a half seconds and a maximum period of approximately three seconds, is then passed directly into a vacuum chamber maintained at a sufficient vacuum to reduce the temperature of the milk below 170° F. and preferably to a temperature of approximately 130° F., and is then passed to a cooler or other processing mechanism preparatory to passing to the bottle, can or carton filling machine.

It is a still further object of our present invention to provide a process for the heat sterilization of milk which process consists of a minimum of steps, which process does not require the services of highly-trained operating personnel, which process is devoid of the shortcomings and disadvantages of the processes of the prior art, and which process is highly efficient for the purposes for which it is intended.

In the accompanying drawing, wherein we have, for the purpose of illustration, shown more or less diagrammatically, apparatus which may be used for carrying out the process of the present invention:

Fig. 1 is a flow sheet showing schematically and with the aid of appropriate legends, apparatus capable of carrying out and performing the several steps of the novel process involved in this application, Fig. 2 is a fragmentary view showing the use of a homogenizer interposed between the preheater, prewarmer or flash pasteurizer and the sterilizer, and Fig. 3 is a fragmentary view showing an installation in which an homogenizer is interposed between the preheater, prewarmer or flash pasteurizer and the sterilizer, and in which valve means are provided for passing the fluent material undergoing sterilization direct from the preheater, prewarmer or flash pasteurizer to the sterilizer, or selectively, from the said preheater, prewarmer or flash pasteurizer, through the homogenizer to the sterilizer.

Referring more particularly to Fig. 1 of the accompanying drawing, the numeral 1 designates a gear pump which receives milk from a suitable supply source and feeds the same under pressure to a preheater, prewarmer, or flash pasteurizer 2 of any preferred or conventional construction capable of raising the temperature of the milk to, say, approximately 145° F. to a temperature not to exceed approximately 165° F. The preheated or prewarmed milk is forced by pump 1 through the preheater, prewarmer or flash pasteurizer 2 and through a pipe or conduit 3 into the upper portion of a sterilizer 4 having therein a plurality of spaced parallel and vertically-disposed plates 5 to the tops of which milk is fed in a smooth, uniform flow to flow downwardly over the surfaces of said plates from the tops to the bottoms thereof in the form of a thin, uniform film. Upon leaving the lower edges of plates 5, the milk falls into a sump 6, which sump consists of a relatively short pipe of relatively small diameter, say, of an internal diameter of the order of one and a half inches. The liquid level in sump 6 is controlled by suitable regulating means and said sump and the liquid therein constitute a liquid seal which effectively prevents the discharge of steam or other highly heated gaseous treating medium from the sterilizer 4 with the milk being processed therein, a suitable outlet for the steam or other highly heated gaseous treating medium being provided, as will be hereinafter described.

As shown in Fig. 2 of the accompanying drawing, it is within the scope of our present invention to insert or mount within the connection between the preheater, prewarmer or flash pasteurizer 2 and sterilizer 4, an homogenizer 7 of any preferred or conventional construction capable of effecting homogenization of the milk undergoing treatment, and which homogenizer 7 is also operable as a pump to draw the preheated or prewarmed milk from the preheater, prewarmer or flash pasteurizer 2 and deliver it under pressure to sterilizer 4. When an homogenizer 7 is used, the temperature of the milk as it leaves the preheater, prewarmer or flash pasteurizer 2 should not exceed approximately 155° F. so that the temperature imparted to the milk by said homogenizer, which increase in temperature is inherent in the operation of the homogenizer, will not raise the total temperature of the milk to a point in excess of approximately 165° F. as the milk enters the sterilizer 4.

As shown in Fig. 3 of the accompanying drawing, it is also within the scope of our present invention to insert or mount within the connection between the preheater, prewarmer or flash pasteurizer 2 and sterilizer 4, an homogenizer 7 of the type shown in Fig. 2, and to provide valve means 8 and a pipe or conduit 9 for selectively passing the milk through the homogenizer or by-passing the homogenizer 7 and passing the milk directly from the preheater, prewarmer or flash pasteurizer 2 to the sterilizer 4. In the form of apparatus shown in Fig. 3, the supply of milk to the preheater, prewarmer or flash pasteurizer 2 is controlled by a 3-way valve 10, which valve when in one position, passes milk therethrough to the inlet side of a gear pump 1, and which valve, when in another position, by-passes said pump and directs the flow of milk from the source of supply into the preheater, prewarmer or flash pasteurizer 2 through a by-pass pipe or conduit 11. When the valve 10 is moved to a third position, the supply of milk is completely cut off. The valve 8 is also a valve of the 3-way type, which valve, when in one position, passes milk therethrough from the preheater, prewarmer or flash pasteurizer 2 to the homogenizer 7 and which valve, when in another position, by-passes said homogenizer 7 and directs the flow of milk from the preheater, prewarmer or flash pasteurizer 2 to the sterilizer 4. When said valve 8 is moved to a third position, the supply of milk to the sterilizer is completely cut off. It will be understood from the foregoing description, and from Fig. 3 of the accompanying drawing, that when homogenizer 7 is used, it is not necessary to employ pump 1, in which event valve 10 is actuated to by-pass said pump and to feed the milk through by-pass pipe or conduit 11, and valve 8 is actuated to pass the milk therethrough from preheater, prewarmer or flash pasteurizer 2 and through the homogenizer 7, homogenizer 7, in addition to its homogenizing function, serves as a pump to draw the milk from the source of supply, through the preheater, prewarmer or flash pasteurizer 2 and to force the same under pressure into the sterilizer 4.

The sterilizer 4 is of a construction such that the preheated or prewarmed milk is so distributed therein that substantially all of the milk flows downwardly along the surface of the spaced, parallel, vertically disposed plates 5 therein in the form of a thin film of substantially uniform thickness which completely covers the surfaces of said plates, being subjected in its downward travel to direct surface contact and heat exchange relation with a highly heated gaseous treating medium, such as steam, of an effective temperature and pressure sufficient to raise each and every particle of the milk to a temperature of 300° F.

To effect sterilization of the milk undergoing treatment in accordance with our present invention, and to provide sterilized milk possessing its natural flavor, stability, body, color, etc., a highly heated gaseous treating medium, such as steam from a suitable source, is supplied to the sterilizer 4 through an inlet valve 12 at a temperature and pressure depending upon the character of the milk undergoing treatment but always sufficiently high and so distributed within said sterilizer as to create throughout the interior thereof a constant effective temperature of 300° F. and a pressure slightly below the pressure imparted to the milk by the gear pump 1 or the homogenizer 7 as it is fed, under pressure, to the sterilizer 4. The milk passes through the sterilizer 4 at a controlled rate of flow determined, to a large extent, by the vertical length of the plates 5, which rate of flow will insure the raising of the temperature of every particle of the milk to 300° F. for at least 1.5 seconds and which will not subject any particle of the milk to this 300° F. temperature for more than approximately three seconds. This specific time-temperature relationship is carefully and accurately maintained by suitable temperature responsive control mechanism of any preferred or conventional construction, so that at no time during the flow or passage of the milk through sterilizer 4 will any particle of the milk be raised to a temperature in excess of 300° F.

The milk at a temperature of 300° F. passes from the sump 6 through a relatively short pipe or conduit 13 connected at one end to the bottom of said sump and at its other end to the inlet side of a specially designed valve 14 located immediately adjacent a vacuum chamber 15 and having its discharge or outlet side connected directly to said vacuum chamber. It will be readily apparent that sump 6 and pipe or conduit 13 constitute, in reality, a part of sterilizer 4 and that the end of said pipe or conduit connected to valve 14 really constitutes the discharge end of the sterilizer. The valve serves a triple purpose, i.e., it serves, first, as a pressure controlling valve which maintains every particle of the milk under uniform pressure from the time the milk enters sterilizer 4 until it passes through said valve and into the vacuum chamber 15; second, it serves as a pressure reducing valve for reducing the pressure of the milk as it passes from the discharge end of sterilizer 4 and into the vacuum chamber 15, and, third, it serves to maintain a constant predetermined level of milk within sump 6. To accomplish this last-mentioned function, said valve 14 may be of the electric motor driven type, the operation of which is controlled by a pair of vertically-spaced electrodes 16 and 17 positioned within the sump 6 and connected to the terminals of the motor of said valve by connectors 18 and 19, respectively, this type of liquid level control, electric motor operated valve being old and well known in the art.

The vacuum chamber 15 is of any preferred or conventional construction, and is maintained at a sufficient vacuum to reduce instantaneously the temperature of the milk as it enters the vacuum chamber to a temperature below 170° F. and preferably to 130° F. The milk is withdrawn from the bottom of vacuum chamber 15 by means of a suitable pump 20, preferably a screw type pump, and is forced by said pump into a cooler or other processing apparatus preparatory to passage to a bottle, can or carton filling machine. The vapors which accumulate in the upper portion of vacuum chamber 15 pass out at the top thereof through outlet pipe 21, while the steam and vapors within sterilizer 4 pass out of said sterilizer through a valve-controlled outlet pipe 22 to the preheater, prewarmer or flash pasteurizer 2, to the heating jacket or coils of vacuum chamber 15, or to some other point of utilization.

Having thus described the important and essential steps of the process of sterilization of our present invention, reference will now be made to further details thereof While, in the foregoing description we have referred to the preheating or prewarming of the milk, it is to be noted that such preheating is not essential but is highly desirable. If the milk is not preheated or prewarmed as described, much greater care, control and regulation would be required in carrying out our present process in order to insure proper sterilization and the production of a uniform and commercially acceptable product. Milk introduced into the sterilizer 4 at a low or varying temperature will require the application of a greater effective degree of heat within the sterilizer and will necessitate adjustment of the rate of flow of the milk and of the volume and temperature of the steam in order to insure a uniform and commercially acceptable product. Hence, in the operation of our present invention, we prefer to preheat the milk by employing a preheater, prewarmer or flash pasteurizer 2 with or without homogenizer 7, to preheat or prewarm the milk to a temperature not to exceed 165° F., as at temperatures above 165° F. the albumen content of the milk, if held at temperatures above 165° for more than approximately thirty seconds, would start to coagulate and sulfhydrils would form from one or more of the proteins present in the milk, particularly from the beta lactoglobulin protein.

While we have herein described the use of an homogenizer prior to the entry of the milk into the sterilizer 4, the use of such a device is unnecessary when heat sterilizing non-fat milk such, for example, skimmed milk. The use of an homogenizer 7 is highly recommended for two reasons, i.e., first, to feed to the sterilizer 4 an homogenous mass rather than an unbalanced mass of the milk undergoing treatment, and second, to expose to the subsequent heat treatment a greater surface of the milk fat to thus insure maximum enzyme inactivation.

In the operation of our present process, it is to be particularly noted that no particle of the milk at any time during its introduction to, or its passage through the sterilizer 4, flows through or over or in contact with a surface which has a temperature substantially higher than that of the milk itself. This is to be clearly distinguished from the prior art processes wherein the milk comes in contact with heated plates, or flows through heated tubes which are always maintained at, or acquire, a temperature greatly in excess of the temperature of the milk. In such prior art devices certain particles of the milk are invariably heated or raised to temperatures in excess of 300° F. which results in coagulation, "off" or "cooked" flavor, "browning," "stick-on," etc.

Our present process also possesses decided advantages over the hot plate and hot tube prior art processes, over steam injection processes, over spray heating processes, and over any other milk sterilization process or processes of which we are aware. Many of these prior art processes and particularly those processes which employ tubular or plate heaters, operate under closed circuit conditions, in which various gases and vapors formed in and from the milk as the result of the heat treatment do not escape from the milk and are retained therein, thus affecting adversely the flavor of the milk. The use of high pressure steam atomizers or sterilizers of the steam injection type, in accordance with the prior art processes, results in an instantaneous heating of the milk, and there does not exist a sufficient "holding" time to effect total inactivation of the enzymes. When both steam and milk emerge from the discharge end of the steam injection sterilizer of the prior art and are passed into a vacuum chamber, excessive superheating takes place which results in undesirable coagulation of the casein, milk sugar, and whey portions of the milk protein. In the conventional spray heat-treating processes wherein the milk is sprayed into a highly heated chamber under pressure, the heating medium intermingles unequally with the individual particles of the milk and there is a marked tendency for the milk to "stick on" to the hot walls of the spray chamber. Further, the conventional spray process is not entirely satisfactory from a practical commercial standpoint, as the milk and the heating medium are discharged through a common outlet, which necessitates subsequent separation and involves entrainment losses.

As distinguished from the prior art processes, the process of our present invention involves, as important and essential features thereof, a process wherein the milk is held at the 300° F. temperature for a minimum of one and a half seconds which results not only in substantially total inactivation of the enzyme content of the milk, but also in substantially total sterilization thereof. The milk is discharged from the sterilizer 4 within a maximum period of approximately three seconds which prevents both excessive coagulation and the formation of sulfhydrils. The total absence of sulfhydrils in the sterilized product of the present invention shows conclusively that there has been no adverse alteration of the protein content of the milk, which is a factor which contributes in a large degree to the production of a sterilized milk product having a high degree of stability or "shelf life." The passage of the milk through the sterilizer 4 over the spaced, parallel vertically-disposed plates 5 therein results in a smooth, steady flow of the milk free from agitation and tends to preserve the natural stability of the milk. Agitation during heating causes visible coagulation to occur more readily and more quickly than it would in a case where the milk is heated with a minimum of agitation. The fact that in our present process, the milk and heating medium are discharged from the sterilizer through separate outlets, is an important feature of our present process, as is the fact that the temperature of the milk as it leaves the discharge end of the sterilizer is instantaneously reduced within the vacuum chamber to a temperature which will not adversely affect the milk.

We have thus fulfilled the specified objects of our present invention by providing a process for the sterilization of milk which results in the production of a sterile product and a product which possesses all of the desirable properties and characteristics of fresh milk. Where, in the foregoing specification and in the subjoined claims, we refer to "milk," it is to be understood that this term is intended to be of sufficient scope to comprehend whole milk, skim milk, cream, concentrated milk, in fact, all known milks and milk products.

Having thus described our invention, we claim:

1. A process for the sterilization of milk while maintaining the natural characteristics of the same comprising the steps of prewarming the milk to a temperature of approximately 145° F. to approximately 165° F., subjecting the prewarmed milk in the form of a thin, downwardly flowing film within a closed sterilizing chamber to direct heat exchange contact with steam of a controlled and effective temperature sufficient to raise every particle of the milk to a temperature of 300° F. and no higher, forming and maintaining a liquid seal of the milk at the bottom of said sterilizing chamber inwardly of the discharge end thereof, holding the milk at said last-mentioned temperature for a minimum of one and a half seconds and a maximum of approximately three seconds, separating the steam from the milk, and instantaneously reducing the temperature of the milk preparatory to further processing, the liquid seal formed and maintained by the milk at the bottom of the sterilizing chamber preventing discharge of the steam with the milk.

2. A process for the sterilization of milk while maintaining the natural characteristics of the same comprising the steps of prewarming the milk to a temperature of approximately 145° F. to approximately 155° F., passing the prewarmed milk through an homogenizer whereby the milk is homogenized and the temperature thereof raised approximately 10° F., subjecting the prewarmed homogenized milk in the form of a thin, downwardly flowing film within a closed sterilizing chamber to direct heat exchange contact with steam of a controlled and effective temperature sufficient to raise every particle of the milk to a temperature of 300° F. and no higher, forming and maintaining a liquid seal of the milk at the bottom of said sterilizing chamber inwardly of the discharge end thereof, holding the milk at said last-mentioned temperature for a minimum of one and a half seconds and a maximum of approximately three seconds, separating the steam from the milk, and instantaneously reducing the temperature of the milk preparatory to further processing, the liquid seal formed and maintained by the milk at the bottom of said sterilizing chamber preventing discharge of the steam with the milk.

3. A process for the sterilization of milk while maintaining the natural characteristics of the same comprising the steps of prewarming the milk to a temperature of approximately 145° F. to approximately 165° F., subjecting the prewarmed milk in the form of a thin, downwardly flowing film within a closed sterilizing chamber to direct heat exchange contact with steam of a controlled and effective temperature sufficient to raise every particle of the milk to a temperature of 300° F. and no higher, forming and maintaining a liquid seal of the milk at the bottom of said sterilizing chamber inwardly of the discharge end thereof, holding the milk at said last-mentioned temperature for a minimum of one and a half seconds and a maximum of approximately three seconds, separating the steam from the milk, and instantaneously reducing the temperature of the milk to a temperature below 170° F. preparatory to further processing, the liquid seal formed and maintained by the milk at the bottom of said sterilizing chamber preventing discharge of the steam with the milk.

4. A process for the sterilization of milk while maintaining the natural characteristics of the same comprising the steps of prewarming the milk to a temperature of approximately 145° F. to approximately 165° F., subjecting the prewarmed milk in the form of a thin, downwardly flowing film within a closed sterilizing chamber to direct heat exchange contact with steam of a controlled and effective temperature sufficient to raise every particle of the milk to a temperature of 300° F. and no higher, forming and maintaining a liquid seal of the milk at the bottom of the sterilizing chamber inwardly of the discharge end thereof, holding the milk at said last-mentioned temperature for a minimum of one and a half seconds and a maximum of approximately three seconds, separating the steam from the milk, and instantaneously reducing the temperature of the milk to approximately 130° F. preparatory to further processing, the liquid seal formed and maintained by the milk at the bottom of said sterilizing chamber preventing discharge of the steam with the milk.

5. A process for the sterilization of milk while maintaining the natural characteristics of the same comprising the steps of prewarming the milk to a temperature of approximately 145° F. to approximately 165° F., passing the prewarmed milk in the form of a thin, downwardly flowing film through a sterilizing chamber in direct heat exchange contact with steam evenly distributed throughout the chamber and of a controlled and effective temperature sufficient to raise every particle of the milk to a temperature of 300° F. and no higher, forming and maintaining a liquid seal of the milk at the bottom of said sterilizing chamber inwardly of the discharge end thereof, holding the milk in said sterilizing chamber at said last-mentioned temperature for a minimum of one and a half seconds and a maximum of approximately three seconds, separating the steam from the milk and discharging said milk free from steam from said sterilizing chamber, and instantaneously reducing the temperature of the milk preparatory to further processing, the liquid seal formed and maintained by the milk at the bottom of said sterilizing chamber preventing discharge of the steam with the milk.

6. A process for the sterilization of milk while maintaining the natural characteristics of the same comprising the steps of prewarming the milk to a temperature of approximately 145° F. to approximately 165° F., flowing the prewarmed milk downwardly in the form of a thin film of uniform thickness along the surface of a substantially vertically-suspended plate positioned within a sterilizing chamber within which is evenly distributed steam of a controlled and effectve temperature sufficient, by direct heat exchange contact with the downward flowing thin film of milk, to raise every particle of the milk to a temperature of 300° F. and no higher, forming and maintaining a liquid seal of the milk at the bottom of said sterilizing chamber inwardly of the discharge end thereof, holding the milk within said sterilizing chamber at said last-mentioned temperature for a minimum of one and a half seconds and a maximum of approximately three seconds, separating the steam from the milk and discharging said milk free from steam from said sterilizing chamber, and instantaneously reducing the temperature of the milk to a temperature below 170° F. preparatory to further processing, the liquid seal formed and maintained by the milk at the bottom of said sterilizing chamber preventing discharge of the steam with the milk.

7. A process for the sterilization of milk while maintaining the natural characteristics of the same comprising the steps of prewarming the milk to a temperature of approximately 145° F. to approximately 165° F., flowing the prewarmed milk downwardly in the form of thin films of uniform thickness along the opposite plane surfaces of a vertically suspended plate positioned within a closed sterilizing chamber within which is evenly distributed steam of a controlled and effective temperature sufficient, by direct heat exchange contact with the downwardly flowing thin films of milk, to raise every particle of the milk to a temperature of 300° F. and no higher, forming and maintaining a liquid seal of the milk at the bottom of said sterilizing chamber inwardly of the discharge end thereof, holding the milk within said sterilizing chamber at said last-mentioned temperature for a minimum of one and a half seconds and a maximum of approximately three seconds, separating the steam from the milk and discharging said milk free from steam from said sterilizing chamber, and instantaneously reducing the temperature of the milk to a temperature below 170° F. preparatory to further processing, the liquid seal formed and maintained by the milk at the bottom of said sterilizing chamber preventing discharge of the steam with the milk.

8. A process for the sterilization of milk while maintaining the natural characteristics of the same comprising the steps of prewarming the milk to a temperature of approximately 145° F. to approximately 165° F., flowing the prewarmed milk downwardly in the form of a thin film of uniform thickness along the surface of a substantially vertically-suspended plate within a closed sterilizing chamber within which is evenly distributed steam of a controlled and effective temperature sufficient, by direct heat exchange contact with the downwardly flowing thin film of milk, to raise every particle of the milk to a temperature of 300° F. and no higher, forming and maintaining a liquid seal of the milk at the bottom of said sterilizing chamber inwardly of the discharge end thereof, holding the milk within said sterilizing chamber at said temperature of 300° F. for a minimum of one and a half seconds and a maximum of approximately three seconds, separating the steam from the milk and discharging said milk free from steam from the discharge end of said sterilizing chamber directly into a vacuum chamber maintained at a sufficient degree of vacuum to reduce the temperature of the milk to a temperature below 170° F. preparatory to further processing, the liquid seal formed and maintained by the milk at the bottom of said sterilizing chamber preventing discharge of said steam into said vacuum chamber through the discharge end of said sterilizing chamber.

9. A process for the sterilization of milk while maintaining the natural characteristics of the same comprising the steps of prewarming the milk to a temperature of approximately 145° F. to approximately 165° F., flowing the prewarmed milk downwardly in the form of thin films of uniform thickness along the opposite plane surface of a vertically-suspended plate positioned within a closed sterilizing chamber within which is evenly distributed steam of a controlled and effective temperature sufficient, by direct heat exchange contact with the downwardly flowing thin films of milk, to raise every particle of the milk to a temperature of 300° F. and no higher, forming and maintaining a liquid seal of the milk at the bottom of said sterilizing chamber inwardly of the discharge end thereof, maintaining the liquid level of said seal to prevent an accumulation of milk within the bottom of said sterilizer, holding the milk within said sterilizing chamber at said temperature of 300° F. for a minimum of one and a half seconds and a maximum of approximately three seconds, separating the steam from the milk and discharging said milk free from steam from the discharge end of said sterilizing chamber beyond said liquid seal directly into a vacuum chamber maintained at a sufficient degree of vacuum to reduce the temperature of the milk to a temperature of approximately 130° F. preparatory to further processing, the liquid seal formed and maintained by the milk at the bottom of said sterilizing chamber preventing discharge of said steam into said vacuum chamber through the discharge end of said sterilizing chamber, and the downwardly flowing films of milk along the opposite plane surfaces of said plate preventing the temperature of said plate from substantially exceeding the temperature of the milk.

10. A process for the sterilization of milk while maintaining the natural characteristics of the same comprising the steps of prewarming the milk to a temperature of approximately 145° F. to approximately 165° F., flowing the prewarmed milk downwardly in the form of a thin film of uniform thickness along the surface of a substantially vertically-suspended plate within a closed sterilizing chamber within which is evenly distributed steam of a controlled and effective temperature sufficient, by direct heat exchange contact with the downwardly flowing thin film of milk, to raise every particle of the milk to a temperature of 300° F. and no higher, forming and maintaining a liquid seal of the milk at the bottom of said sterilizing chamber inwardly of the discharge end thereof, holding the milk within said sterilizing chamber at said temperature of 300° F. from a minimum of one and a half seconds and a maximum of approximately three seconds, discharging a portion of the steam from the sterilizing chamber above the liquid seal while maintaining the controlled and effective temperature within said chamber sufficient to raise every particle of the milk to a temperature of 300° F. and no higher, and discharging said milk from the discharge end of said sterilizing chamber beyond said liquid seal directly into a vacuum chamber maintained at a sufficient degree of vacuum to reduce the temperature of the milk to a temperature below 170° F. preparatory to further processing, the liquid seal formed by the milk at the bottom of said sterilizing chamber preventing discharge of said steam into said vacuum chamber through the discharge end of said sterilizing chamber.

References Cited in the file of this patent

UNITED STATES PATENTS

| | | |
|---|---|---|
| 1,819,023 | Grindrod | Aug. 18, 1931 |
| 2,049,591 | Rafn | Aug. 4, 1936 |
| 2,115,470 | Rogers | Apr. 26, 1938 |